US011222744B1

(12) United States Patent
Chaparro

(10) Patent No.: US 11,222,744 B1
(45) Date of Patent: Jan. 11, 2022

(54) POWER-DENSE BIPOLAR HIGH-VOLTAGE CAPACITOR CHARGER

(71) Applicant: Jordan E. Chaparro, King George, VA (US)

(72) Inventor: Jordan E. Chaparro, King George, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 16 days.

(21) Appl. No.: 17/011,138

(22) Filed: Sep. 3, 2020

Related U.S. Application Data

(62) Division of application No. 16/441,127, filed on Jun. 14, 2019, now Pat. No. 10,825,604.

(51) Int. Cl.
| | | |
|---|---|---|
| H01F 27/32 | (2006.01) | |
| H02M 3/335 | (2006.01) | |
| H01F 27/02 | (2006.01) | |
| H01F 38/14 | (2006.01) | |
| H01F 27/28 | (2006.01) | |

(52) U.S. Cl.
CPC .......... H01F 27/325 (2013.01); H01F 27/02 (2013.01); H02M 3/33546 (2013.01); *H01F 27/2847* (2013.01); *H01F 2038/146* (2013.01)

(58) Field of Classification Search
CPC ........ H01F 27/02; H01F 27/022; H01F 27/25; H01F 27/266; H01F 27/306; H01F 27/325; H01F 27/2804; H01F 27/2823; H01F 27/2847; H01F 2038/146; H02M 3/33546
See application file for complete search history.

(56) References Cited

U.S. PATENT DOCUMENTS

| | | | | |
|---|---|---|---|---|
| 3,146,417 A | * | 8/1964 | Paula ...................... | H01F 19/06 333/24 R |
| 4,596,972 A | * | 6/1986 | Knight ................... | H01H 50/36 335/128 |
| 4,720,909 A | * | 1/1988 | Knight ................... | H01H 50/36 29/602.1 |
| 4,922,965 A | * | 5/1990 | Meister ................ | F16K 31/0606 137/625.65 |
| 5,719,544 A | * | 2/1998 | Vinciarelli ............ | H01F 27/346 336/184 |
| 6,593,836 B1 | * | 7/2003 | LaFleur ................. | H01F 27/22 336/198 |
| 7,365,630 B1 | * | 4/2008 | Yang ........................ | H01F 3/12 336/198 |
| 7,449,074 B2 | * | 11/2008 | Branagan ........... | B22D 11/0622 148/403 |
| 2018/0068782 A1 | * | 3/2018 | Afsharian ............... | H01F 27/29 |

* cited by examiner

*Primary Examiner* — Yemane Mehari
(74) *Attorney, Agent, or Firm* — Gerhard W. Thielman

(57) ABSTRACT

An exemplary rectifying capacitor multiplier is provided for high voltage. The multiplier includes first and second circuit boards, a series of diodes in pattern groups, first and second packs of capacitors, and a pair of high voltage terminals. The circuit boards are disposed mutually in parallel. The pattern groups are disposed between the first and second circuit boards, with the diodes concatenated in series. The packs are disposed respectively on the respective circuit boards. Each pack distributes a capacitor that connects to a corresponding pattern group. The terminals correspond to positive and negative output voltages and are disposed on opposite sides of the circuit boards.

4 Claims, 10 Drawing Sheets

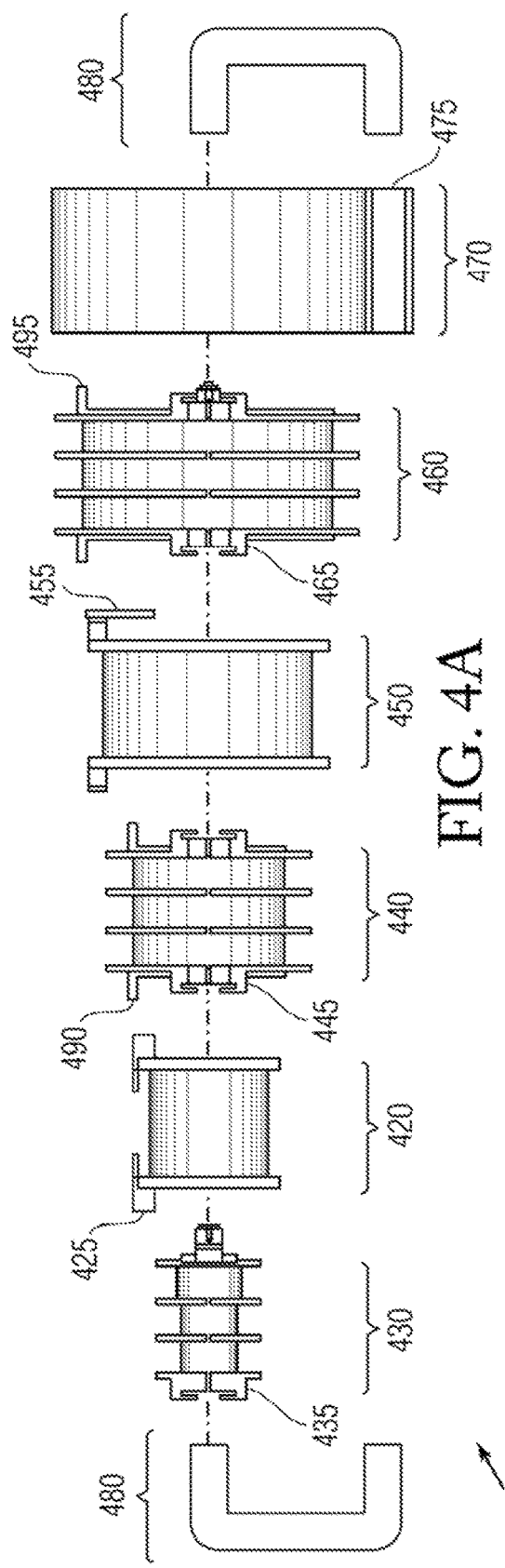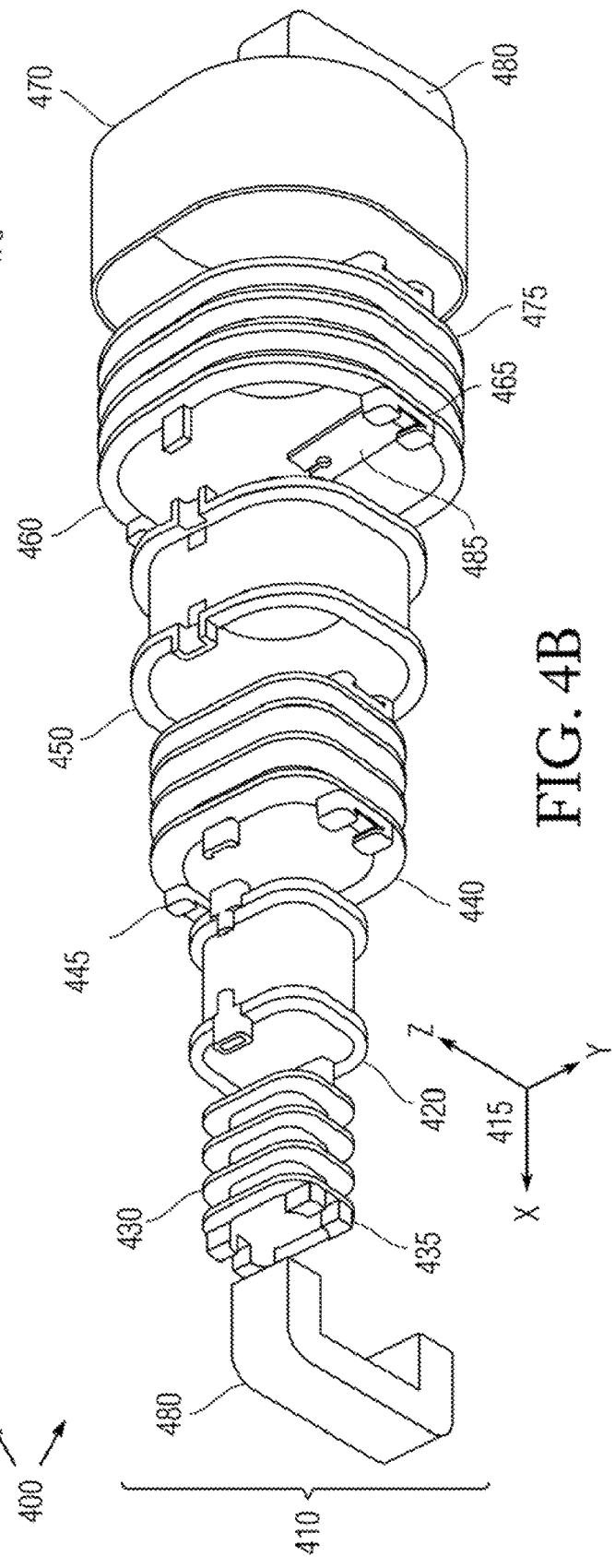
FIG. 4A
FIG. 4B

POWER-DENSE BIPOLAR HIGH-VOLTAGE CAPACITOR CHARGER

CROSS REFERENCE TO RELATED APPLICATION

The invention is a Division, claims priority to and incorporates by reference in its entirety U.S. patent application Ser. No. 16/441,127 filed Jun. 14, 2019 and assigned Navy Case 109095, which claims the benefit of priority from provisional application 62/729,438, with a filing date of Sep. 11, 2018.

STATEMENT OF GOVERNMENT INTEREST

The described invention was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to electrical chargers for capacitors. In particular, the invention relates to high-voltage, constant current capacitor chargers with bipolar output.

Pulsed power systems often use high voltage capacitors as energy stores that are charged and then switched onto a load to produce high peak power. Charging capacitive loads requires a supply that can handle a wide range of output impedances from near short-circuit to high impedance. To this effect, resonant topologies are often used as capacitor chargers because they can be made invariant to the impedance of the load. The power switched through resonant power supplies is dictated by the supply voltage and the resonant impedance of the circuit, which is proportional to the square-root of the ratio of capacitance to inductance in the circuit.

To produce a compact supply, the design should operate with a high switching frequency to reduce the size of magnetic components. Resonant supplies are often designed with a resonant frequency near equal to the switching frequency. The resonant frequency is inversely proportional to the root of the product of the resonant capacitance and inductance. For a high-voltage supply, a transformer with a large turn ratio is required to step up the output voltage. Non-ideal transformers store magnetic energy between the imperfectly coupled inductors leading to an unavoidable leakage inductance that is introduced to the resonant circuit driving the transformer primary. This leakage inductance imposes a restriction on both the power and size of the supply because of its effect on the resonant impedance and resonant frequency. For a given resonant impedance, reducing leakage inductance leads to a higher resonant frequency and thus to a more power-dense supply.

Capacitive pulsed power systems with triggered gas switches preferably operate with a bipolar charge where the terminals of the charge capacitor are driven to equal voltages of opposite polarity. In most cases, this is accomplished by utilizing two supplies of opposite polarity with one connected to each terminal of the charge capacitor. In these configurations, where a ground tap at the center of the load capacitance is not available as a current return, the two power supplies must operate with a virtual ground with return currents passing through the supply of opposite polarity. In such a configuration, the positive and negative polarities on either side of the capacitive load can be imbalanced by circuit parasitic elements, which may yield premature discharges in the pulsed power load.

SUMMARY

Conventional high voltage power supplies yield disadvantages addressed by various exemplary embodiments of the present invention. In particular, various exemplary embodiments provide much higher power density for low-duty cycle applications with passively balanced bipolar charging.

Exemplary embodiments provide an electric transformer for high voltage and low leakage inductance, including an outer housing, a complementary pair of iron C-sections, bobbins and Litz wire. The iron C-sections form a magnetic loop core, forming proximal and distal sides. The bobbins include outer and inner primary bobbins, as well as outer, middle and inner secondary bobbins. The inner secondary bobbin has a center gap for receiving the proximal side of the core and is disposable within the inner primary bobbin. Inner and outer primary Litz wires have rectangular cross-sections and respectively wrap around the inner and outer primary bobbins. The secondary Litz wire contiguously wraps around the secondary bobbins. The primary Litz wires connect together by a shunt. The inner primary bobbin is disposable within the middle secondary bobbin. The middle secondary bobbin is disposable within the outer primary bobbin. The outer primary bobbin is disposable within the outer secondary bobbin. The outer secondary bobbin is disposable within the housing.

Other exemplary embodiments provide, a rectifying multiplier is provided for high voltage. The multiplier includes first and second circuit boards, a series of diodes in pattern groups, first and second packs of capacitors, and a pair of high voltage terminals. The circuit boards are disposed mutually in parallel. The pattern groups are disposed between the first and second circuit boards, with the diodes concatenated in series. The packs are disposed respectively on the respective circuit boards. Each pack distributes a capacitor that connects to a corresponding pattern group. The terminals correspond to positive and negative output voltages and are disposed on opposite sides of the circuit boards.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 4A and 4B are elevation and isometric views of the low leakage inductance, high voltage transformer;

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: time in seconds (s), angles in degrees (°) or radians, volume in liters (L), electric current in amperes (A) with alternating current quantified as root-mean-square (RMS), voltage in volts (V), resistance in ohms (Ω), energy in joules (J), capacitance in farads (F), magnetic inductance in micro-henrys (µH), and frequencies in kilohertz (kHz). Supplemental measures can be derived from these, such as power in kilowatts (kW) or joules-per-second, moment of inertia in gram-square-centimeters (g-cm$^2$) and the like. Note that select circuits can be quantified as an equivalent series resistance (ESR).

Exemplary embodiments provide a passively balanced bipolar high voltage power supply (HVPS) to rapidly charge a bipolar pulsed power system to high voltage with as small of a volume footprint as is feasible. In order to create an HVPS 110 that is both compact (<10 L) and high power (>100 kW), a high turn ratio (1:100) step-up transformer with as low of a leakage inductance as possible has been developed.

By distributing the secondary and primary turns of the transformer in layers around each other, the leakage inductance of a step-up transformer can be reduced by an order of magnitude. Numerical simulation was conducted to minimize the leakage inductance while managing the spacing between the winding sections to ensure sufficient insulation of the high potentials within the transformer.

Figure 1:
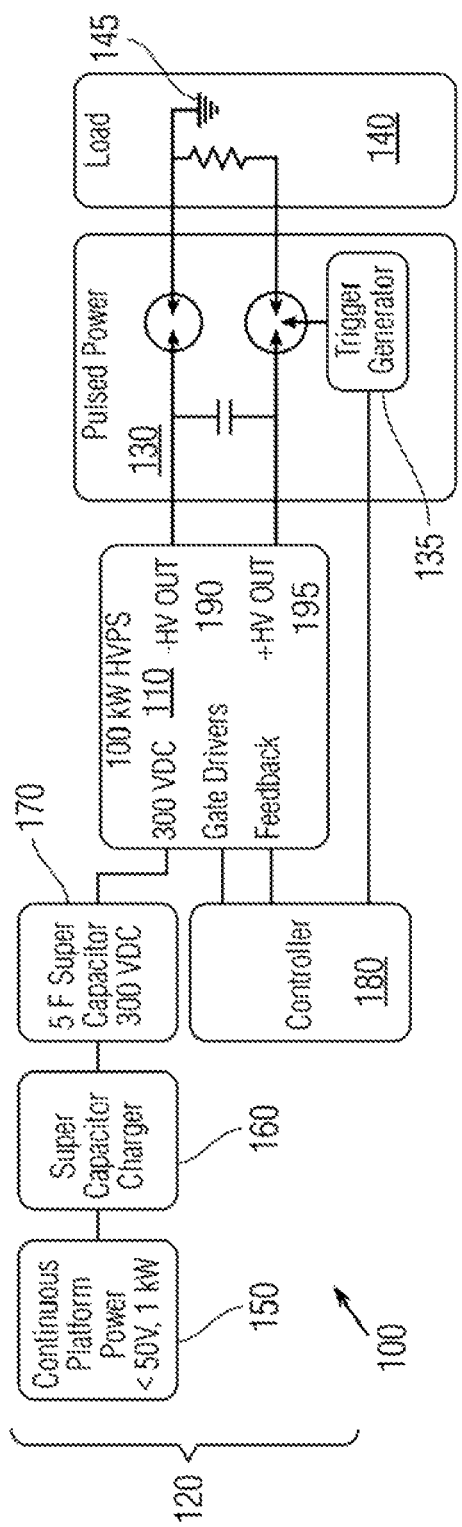
FIG. 1 is a block diagram view of a high-power capacitor charging supply driving a switched capacitive load.

FIG. 1 shows a diagram view 100 of an exemplary HVPS 110 in block diagram 120 for a pulsed power system 130 controlled by a trigger generator 135 that connects to a resistive load 140 connected to a fixed potential 145 called ground. A continuous platform power supply 150 provides potential of <50 V and power of 1 kW to a super capacitor charger 160.

A super capacitor buffer 170 receives charge from the charger 160 and stores a potential of 300 V$_{DC}$ for supply to input terminals of the HVPS 110. A controller 180 provides input to gate drivers, monitors the high voltage feedback terminals of the HVPS 110, and drives the trigger generator 135. The HVPS 110 further includes high voltage (HV) outputs for negative 190 and positive 195 terminals. The pulsed power system 130 includes at least two switches that when simultaneously toggled by the trigger generator 135 discharge the capacitor buffer 170 through the load 140.

The capacitive load in the pulsed power system 130 lacks a center tap to provide a reference to a ground potential, so the HVPS 110 is required to maintain voltage balance across the load capacitor. Exemplary embodiments of the HVPS 110 receive 1 kW prime power. The HVPS 110 requires more than 150 kW to operate within design specifications, so exemplary embodiments provide an ultra-low series resistance super capacitor buffer 170 to accumulate energy from a platform bus and provide high peak power to the HVPS 110 in short bursts of operation.

Figure 2:
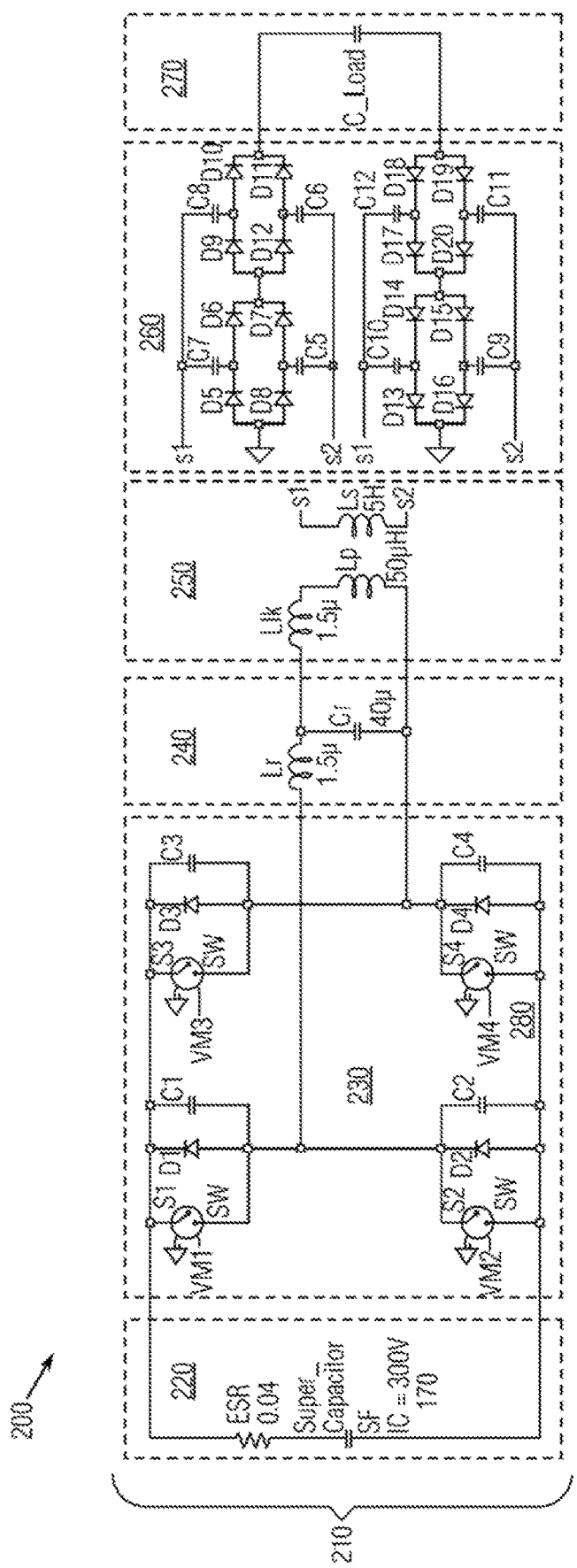
FIG. 2 is an electrical schematic view of the high power capacitor charging supply.

FIG. 2 shows a schematic view 200 of a simplified resonant topology 210 for explanatory purposes, the components include a low ESR super capacitor 220, a full-wave bridge inverter 230, a resonant circuit 240 and a converter for a given switching frequency. A bipolar rectifying multiplier 260 connects to a capacitor load 270. The low ESR capacitor 220 supplies current to the inverter 230. Four bridge circuits 230 comprise the full-wave inverter 230. Each bridge circuit 230, labeled one through four, includes an insulated-gate bipolar transistor (IGBT) switch, a diode and a capacitor in parallel The HVPS 110 incorporates 2400 A repetitive peak rated IGBT switches to construct the full wave inverter 230, The IGBT switch in the circuit 230 includes a gate driver. The capacitor 220, inverter 230 and circuit 240 substantially constitute commercial off-the-shelf (COTS) components.

Figure 3:
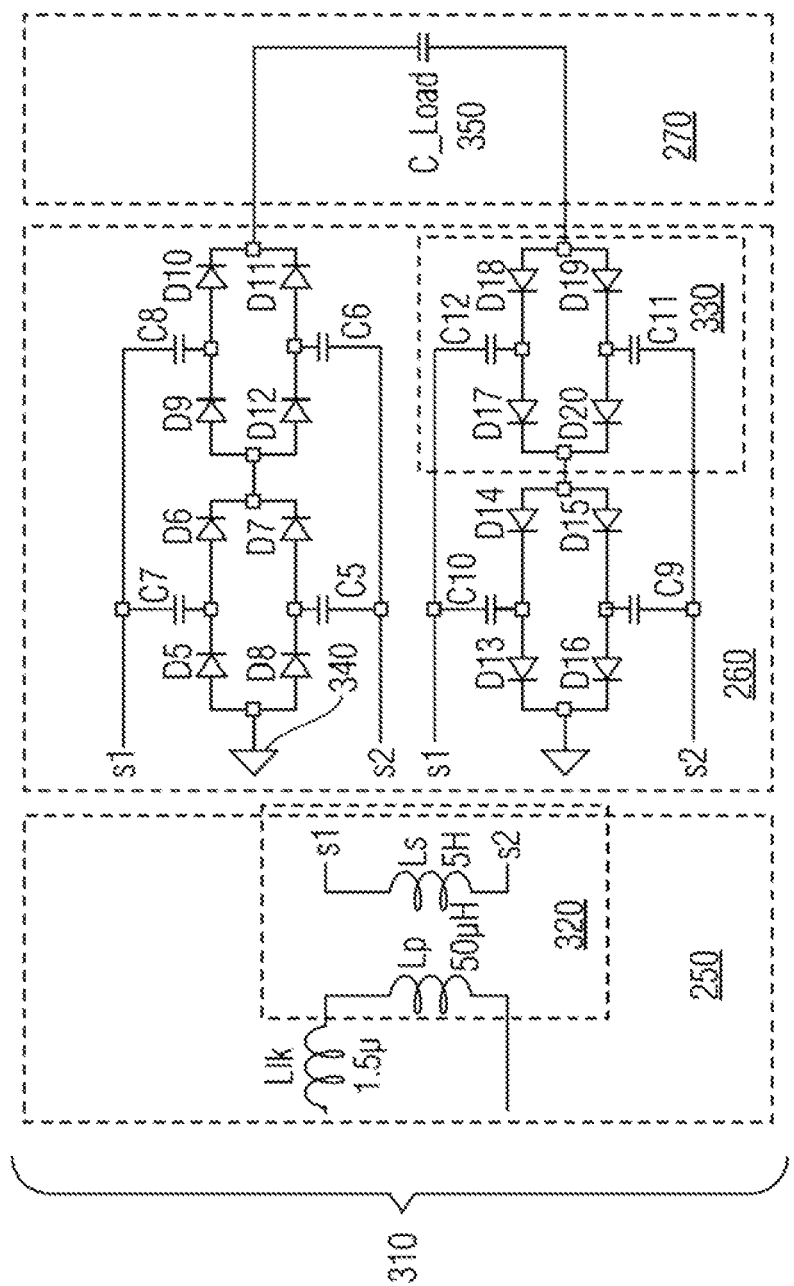
FIG. 3 is an electrical schematic detail view of the low leakage inductance, high voltage transformer and bipolar rectifying multiplier.

FIG. 3 shows a detail schematic view 300 of the right portion 310, including the low leakage transformer 250, bipolar multiplier 260 and the capacitor load 270. The transformer 250 is composed of two coupled inductors 320 with a turn ratio of 1:100 and secondary output terminals labeled s$_1$ and s$_2$. The multiplier 260 includes four diode doubler circuits 330 and receives induction current from the transformer 250. The doubling circuits 330 as stages connect to the s$_1$ and s$_2$ terminals through a capacitive connection at the midpoint of the series diode chain. Each doubling stage 330 includes a pair of capacitors with a parallel string of series diodes, the polarity of which depend on the desired high voltage output polarity. Each stage 330 of the bipolar multiplier 260 further includes a chassis ground 340 and connects to each other by a capacitor 350 in the capacitor load 270.

The exemplary passively balanced bipolar HVPS 110 has been created to drive a compact pulsed power system. Such conditions require the supply to operate at 100 kW with a volume of less than 10 L, which corresponds to a power density at least an order of magnitude higher than commercially available options. The HVPS 110 is also required to produce a bipolar output to charge the capacitor 350 to 100 kV.

The inverter 230 in schematic view 200 for the HVPS 110 creates an alternating current (AC) via four IGBT switches and freewheeling diodes to the resonant circuit 240 that transfers roughly 1.0 kA RMS current to the transformer 250, which by induction supplies 10 A RMS current to the bipolar rectifying multiplier 260 that contains the network of diode doubler circuits 330. The resonant circuit 240 includes a 1.5 µH inductor and a 40 µF capacitor in parallel. The transformer 250 includes a leakage inductance of 1.5 µH and an ideally coupled magnetizing inductance with a multiplication ratio of 1:100. The inductance in the resonance circuit 240 matches to the leakage inductance of the transformer 250. The resonant frequency of the resonant circuit 240 is near 20 kHz, while its resonant impedance is near 0.2Ω.

On the right portion 310, the transformer 250 connects a secondary winding (560 of FIG. 5) to the bipolar rectifying multiplier 260. Each diode doubler circuit 330 includes two legs of rectifying diodes connected to the transformer secondary by capacitors, each leg incorporating a pair of 40 kV, 100 A peak-rated diode series chains. The outputs to the multiplier 260 supplies 2.5 A direct current (DC) to the capacitive load 270 with the terminals of the capacitor 350 charged to equal voltage of opposite polarity with respect to the HVPS chassis ground 145.

The bipolar multiplier 260 attaches to the output of the transformer 250 and has two primary benefits. First is the aforementioned reduction in the step-up requirements of the transformer 250, and second is the capability to produce a passively balanced bipolar high voltage output. To date, bipolar charging of pulsed power systems has been conducted with two HVPS circuits 160; one of each polarity. One important shortcoming of this configuration is that the two supplies have separate ground returns, neither of which is truly referenced to the center potential of the charged capacitor 170 in the absence of a center tap.

This conventional configuration necessitates the return current of one circuit having to flow through the rectifier of the other and then return to the original supply through a chassis connection. This configuration typically leads to more complicated control schemes in order to sense and correct for charge imbalance. In the exemplary HVPS 110 described herein, a single circuit drives both polarities with a common current return point between the two quadruplers 260. Because of the common return point, the supply can operate with open-loop controls and maintain charge balance passively at high charge rates.

FIGS. 4A and 4B show exploded elevation and isometric views 400 of bobbin components 410 that form a nested wire assembly (520 in FIG. 5) depicting the transformer 250 in hardware oriented by a compass rose 415. Litz wires wrap around the bobbin components (550 and 560 in FIG. 5). An inner primary bobbin 420 includes upper and lower terminals 425. An inner secondary bobbin 430 inserts into the primary bobbin 420 and includes terminals 435 as well as a center space. A mid-secondary bobbin 440 includes terminals 445 and inserts into an outer primary bobbin 450 that includes a shunt 455 to connect the two primary bobbins 420 and 450.

The inner primary bobbin 420 inserts into the mid-secondary bobbin 440. An outer secondary bobbin 460 includes terminals 465. The outer primary bobbin 450 inserts into the outer secondary bobbin 460. An outer housing 470 contains the nested bobbins and optionally includes an external side channel 475. The bobbins 420, 430, 440, 450 and 460, as well as the housing 470 are composed of glass-impregnated nylon, produced by three-dimensional printing techniques, to provide dielectric spacing for the windings. Primary bobbins 420 and 450 denote input inductors. Secondary bobbins 430, 440 and 460 denote output inductors.

A pair of nano-crystalline amorphous C-sections 480 attach to each other through the center space and the channel 475 to form a magnetic loop core (530 in FIG. 5), clamped together by a steel band. Dielectric strips 485 extend radially inward from the outer secondary bobbin 460 to lock the assembly (520) together. Primary inductor terminals 490 and 495 are respectively disposed on the inner primary and outer primary bobbins 430 and 450, connected in series by the shunt 455. The terminals 490 and 495 are the two ends of a primary inductor winding (550 in FIG. 5), constituting the points that connect to the HVPS 110.

Figure 5:
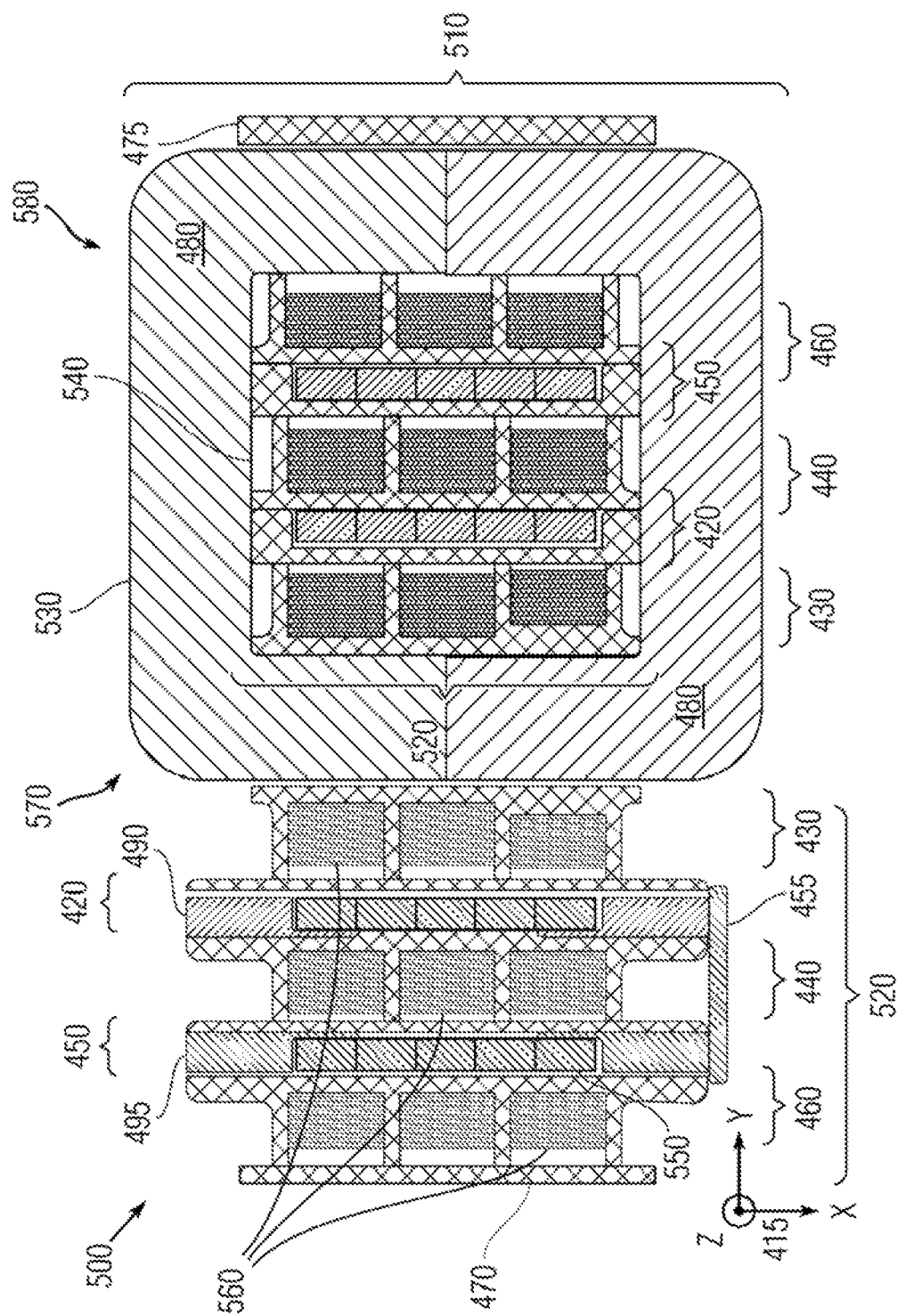
FIG. 5 is an elevation cross-section view of the low leakage inductance high voltage transformer.

FIG. 5 shows an elevation cross-section view 500 of a low leakage inductance transformer 250 in cutaway 510 with the compass rose 415 for orientation reference. A nested bobbin assembly 520 extends around the C-sections 480 that comprise a magnetic core 530 to form a magnetic core window 540 therein. Rectangular cross-section Litz wire wraps around primary bobbins 420 and 450 as primary windings 550. This primary Litz wire for the input inductor has an equivalent cross-section to 8 American wire gauge (AWG) filament wound in a single heavy-gauge row. Its rectangular cross-section maximizes density, and this wire wraps by techniques described in U.S. Pat. No. 8,356,766. Litz wire comprises copper wire with polymer coating for bundling.

Secondary windings 560 for the output inductor are composed of a single continuous strand of 22 AWG Litz wire that winds around secondary bobbins 430, 440 and 460 in multiple layers, folding over and outside the primary bobbins 420 and 450. The assembly procedure involves winding secondary bobbin 430, inserting that into the wound section of primary bobbin 420 covered by the empty secondary bobbin 440, folding the wire from secondary bobbin 430 over primary bobbin 420 and then using that to wind secondary bobbin 440, and so forth. The assembly 520 includes concentric bobbins: inner secondary 430, inner primary 420, mid-secondary 440, outer primary 450 and outer secondary 460 wrapping radially around the proximal side 570 of the core 530. The channel 475 flanks the distal side 580 of the core 530.

An unavoidable inductance in the resonant circuit 240 is presented by the leakage of the high voltage step-up transformer 250. Two approaches were pursued to reduce this inductance as much as possible. First, the transformer 250 is wound (by the Litz wire) so as to geometrically layer the primary windings 550 and secondary windings 560, with spacing only sufficient to isolate high potentials between the primary bobbins 420 and 450.

Second, the transformer primary inductor uses a high aspect ratio rectangular Litz wire as a primary winding 550 to completely fill the lateral space of the core window 540 while minimizing consumption in the other dimension. This minimizes the non-coupling magnetic energy in the transformer 250, thereby reducing leakage inductance. Secondly, in order to reduce the required multiplication ratio of the transformer 250, a quadrupling full-wave multiplier 260 is applied to the transformer's output.

By reducing the required step-up ratio, the leakage inductance can be further reduced by more tightly packing the wire turns of the transformer 250 within the core window 540 owing to the reduced voltage stresses. The transformer 250 is also wound on the nano-crystalline amorphous iron core 530 composed of two C-sections 480 that can operate at much higher flux densities than typical ferrite cores. The increased flux density capacity of the core 530 further reduces the required volume of the transformer 250.

Figure 6:
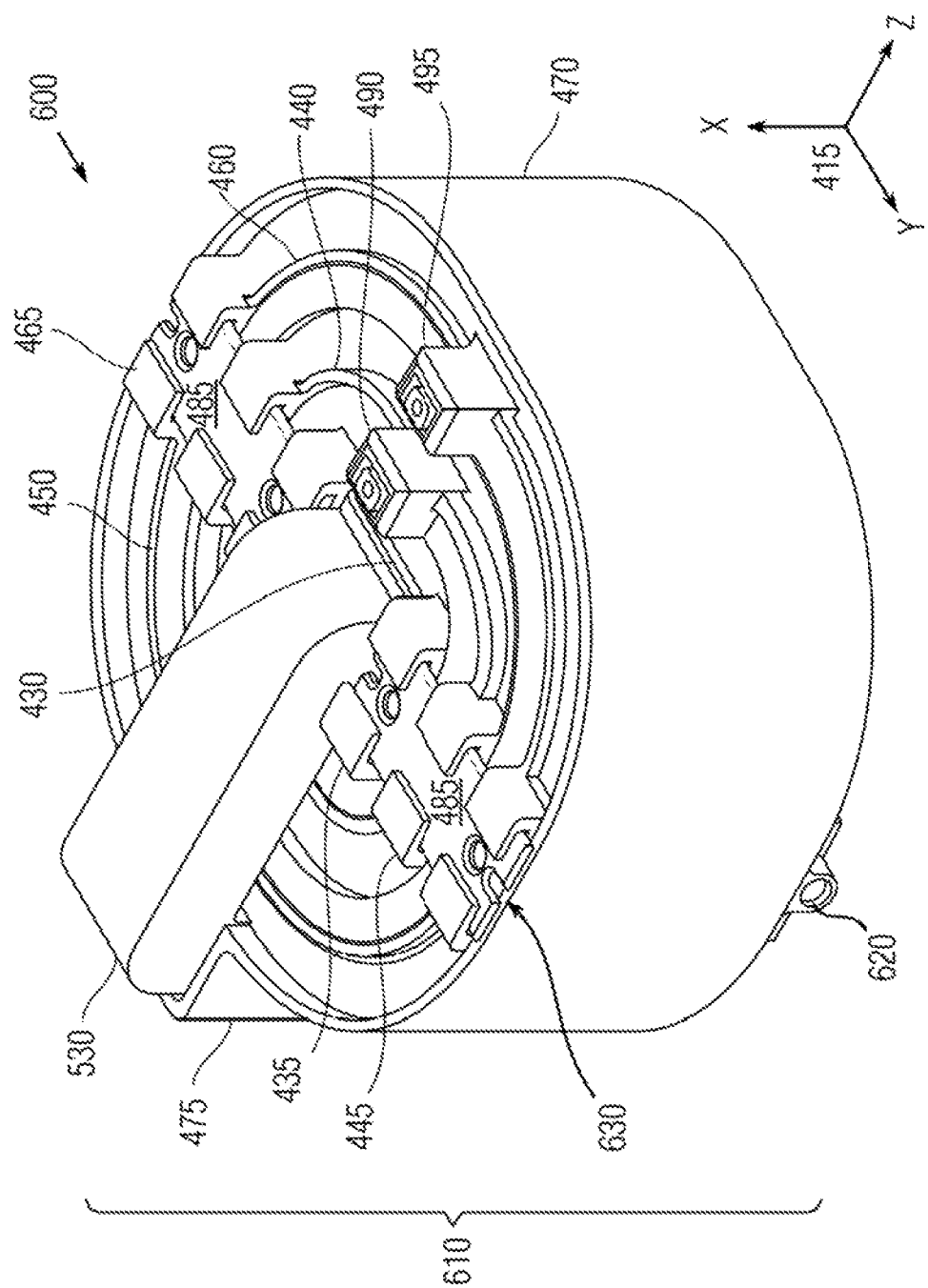
FIG. 6 is an isometric view of the low leakage inductance, high voltage transformer.

FIG. 6 shows an isometric view 600 of a low inductance leakage transformer 250 as hardware assembly 610 with the compass rose 415 for orientation reference. The outer secondary bobbin 460 is the outermost component within the housing 470. The outer primary bobbin 450 with shunt 455 and return connector 495 is disposed within the outer secondary bobbin 460. The mid-secondary bobbin 440 with terminals 445 and input connector 490 is disposed within the outer primary bobbin 450. The inner secondary bobbin 430 with terminals 435 is disposed within the mid-secondary bobbin 440. The inner primary bobbin 420 is obscured in view 600.

Dielectric alignment strips 485 are used to lock the bobbins 410 in position and stiffen the assembly 610. The primary layers of windings 550 are accessed by respective input and return connectors 490 and 495. The secondary layers of windings 560 are accessed on one side of the assembly 610, with the innermost portion of the secondary winding 560 on the bobbin 430 passing through a dielectric guide tunnel 620 used to maintain spacing for voltage insulation purposes. The opposite secondary terminal from the outermost portion of the secondary winding 560 on the bobbin 460 is accessed from a gap 630 on the end of the dielectric locking strip 485.

Figure 7:
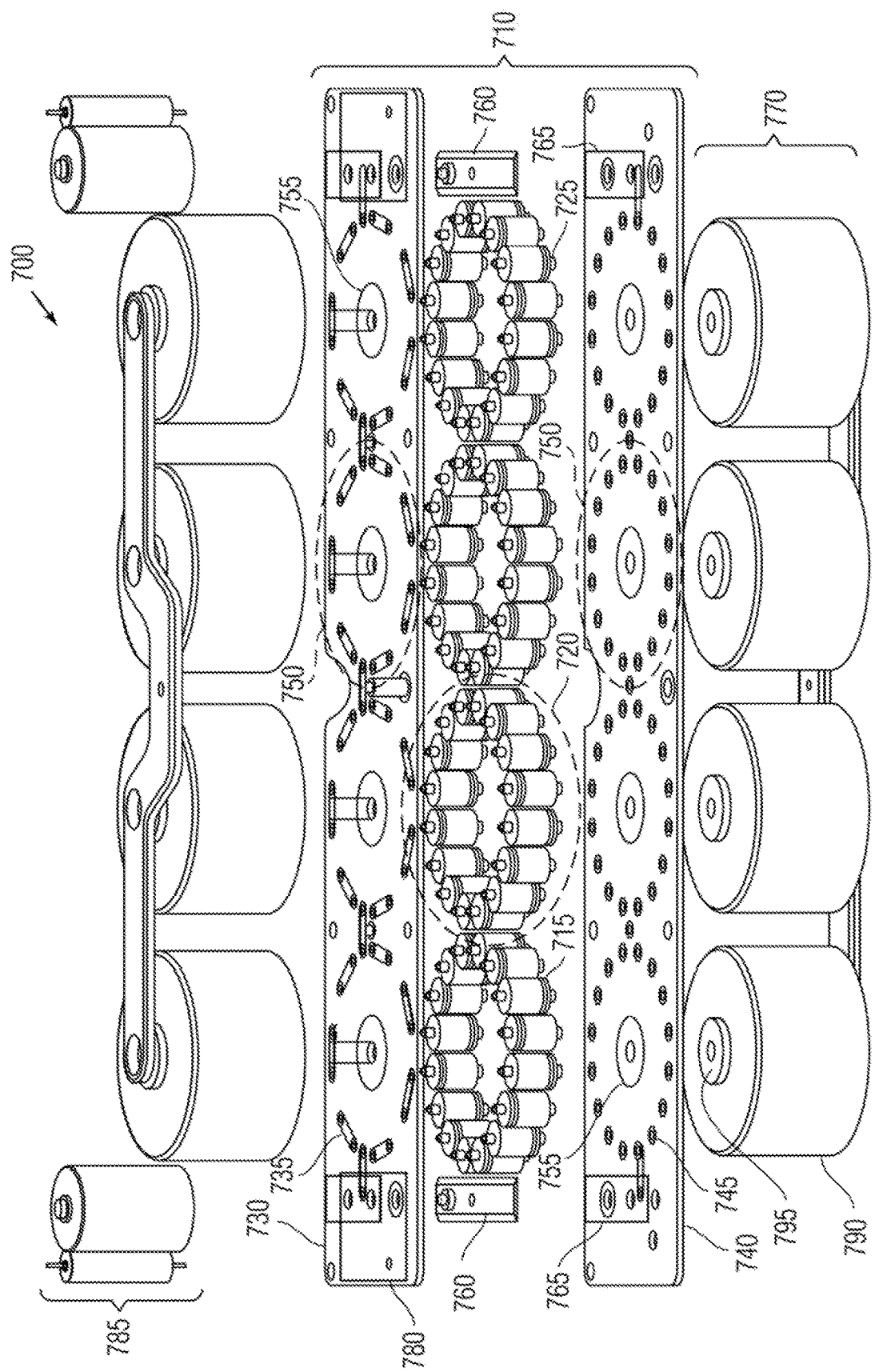
FIG. 7 is an exploded isometric view of bipolar rectifying multiplier components.

FIG. 7 shows an exploded isometric view 700 of components 710 for the bipolar rectifying multiplier 260. A series of axial diodes 715 is disposed with alternating orientations in a circular group pattern 720 to form a series assembly. The diodes 715 have pin terminals 725 at their longitudinal ends, and are sandwiched between an upper board 730 with copper traces 735 and a lower board 740 with soldered connections to plated through-holes 745.

Both boards 730 and 740 include the holes 745 on sides facing each other to receive diode pins 725, and traces 735 on their opposite sides in circular patterns 750 aligned with the diode patterns 720. Four such diode patterns 720 are linearly disposed between the boards 730 and 740. The diodes 715 concatenate in series via their pins 725 connecting through respective traces 735. The connector patterns 750 each have a capacitor connector 755 in their centers.

Output terminals 760 are disposed at either end of the four diode patterns 720 and connect to plated pads 765 on the respective boards 730 and 740, serially connected to the diodes 715. A pair of capacitor packs 770 are disposed to correspondingly connect at the center of each double stage 330 by a threaded stud. A set of resistive voltage dividers 785 attaches to a plated pad 780 disposed on the upper board 730 for connecting to their respective terminals 760. The packs 770 include a series of ceramic capacitors 790 that include threaded terminals 795 that attach to the board connectors 755.

Figure 8:
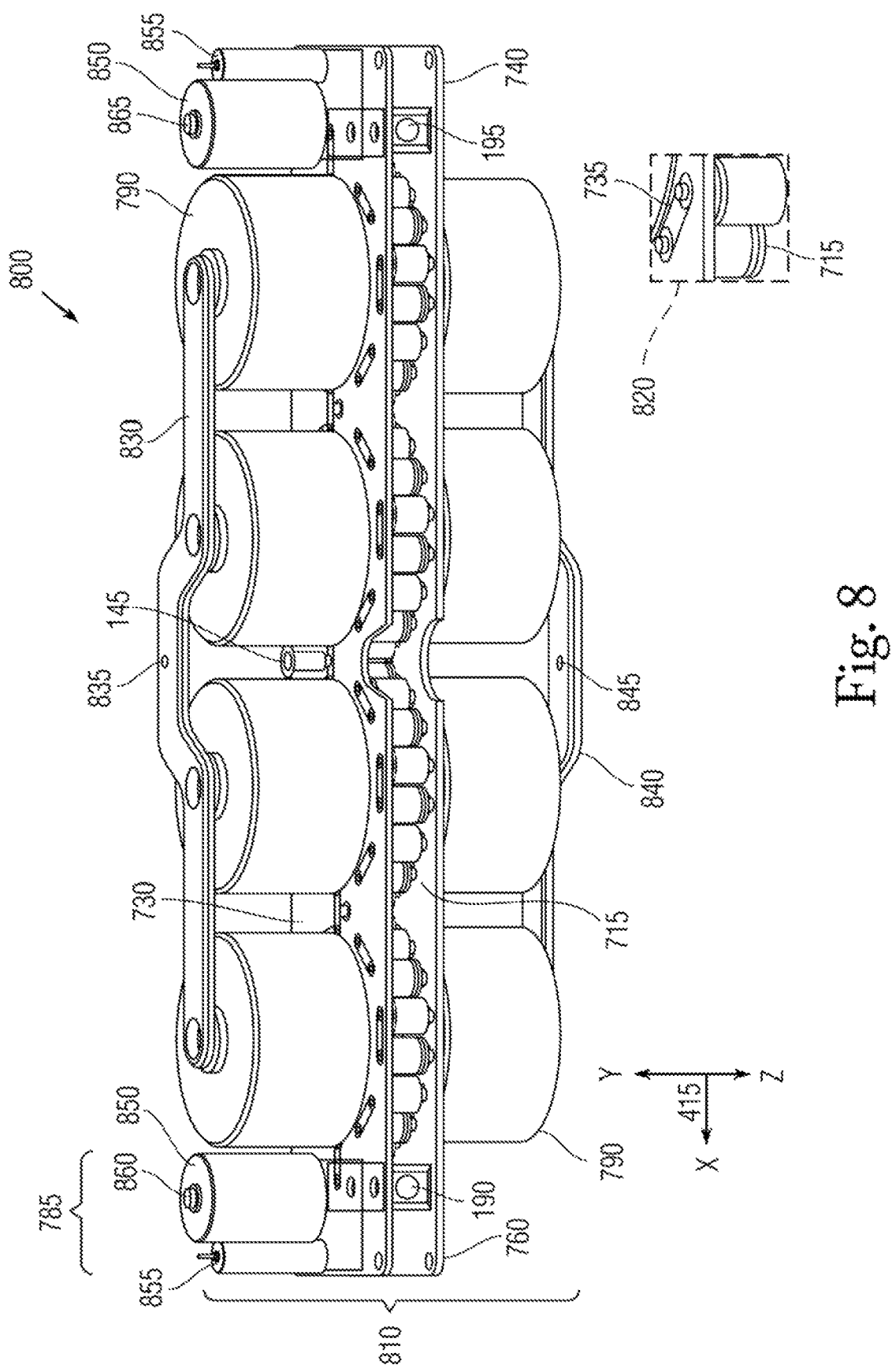
FIG. 8 is an isometric view of the bipolar rectifying multiplier.

FIG. 8 shows an isometric view 800 of the bipolar multiplier 260 in hardware form 810 with the compass rose 415 for orientation. Beyond diode components 710, each pack 770 attaches its set of four capacitors 790 by an upper metallic bus bar 830 that includes a center tap 835 and a lower metallic bus bar 840 that includes a center tap 845. Sandwiched between the packs 770 sit two circuit boards 730 and 740 to dispose the high voltage diodes 715 into four series patterns 720. The center of the quadrupler assembly 810 on the upper and lower boards 730 and 740 is the ground reference potential 145, which ties to the chassis of the HVPS 110.

On the two outside edges of the quadrupler assembly 810 are disposed the positive and negative high voltage output terminals 190 and 195. Additionally, the high impedance side of resistive voltage dividers 850 and 855 used to sense the voltage of each output rail resides in the quadrupler assembly 810. Terminals 190 and 195 respectively connect to negative connector 860 and positive connector 865 on their respective voltage dividers 850.

A dash box between the diode boards 730 and 740 is shown in detail view featuring diodes 715 connected by metallic traces 735. Each diode 715 has a potential of 10 kV and is rated for a peak forward current of 100 A. The diode patterns 720 have opposite orientations with respect to the ground reference potential 145 on the positive and negative sides of the quadrupler assembly 810.

Figure 9A:
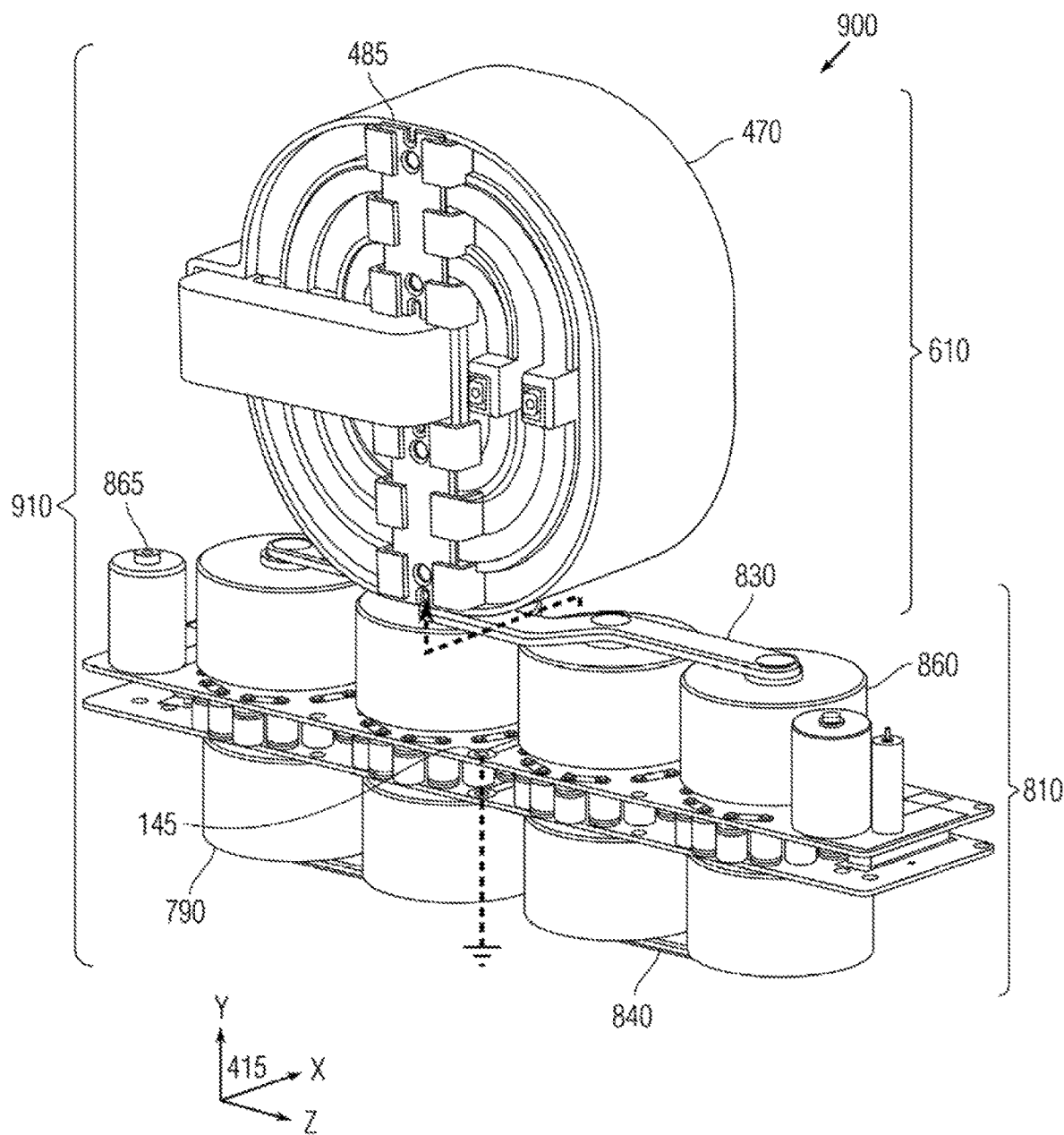
FIGS. 9A and 9B are isometric views of the interconnected multiplier and transformer.
Figure 9B:
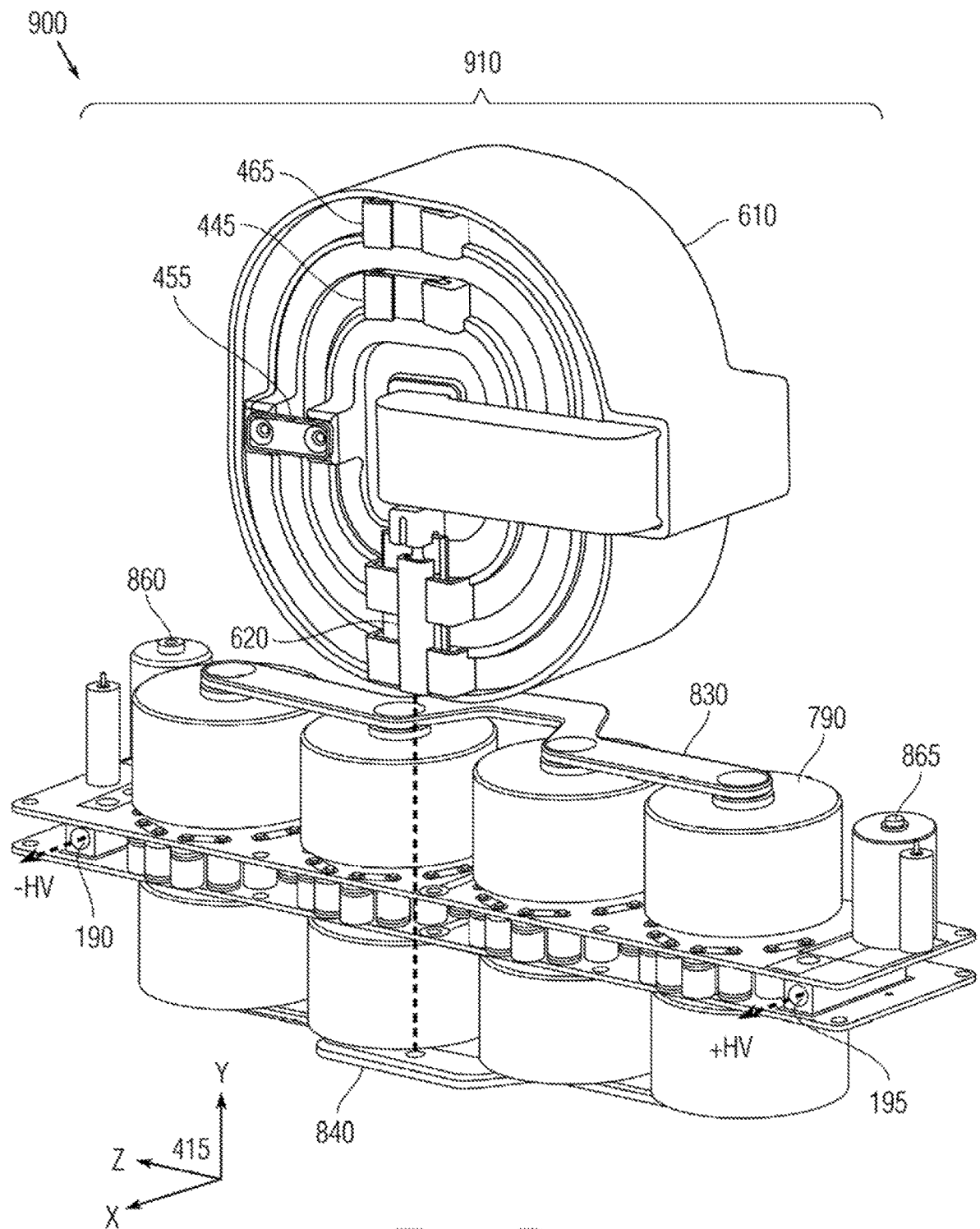

FIGS. 9A and 9B show isometric views 900 of the multiplier 260 connected to the transformer 250 in hardware form 910 as respectively viewed from the rear (FIG. 9A) and front (FIG. 9B) as indicated by the compass rose 415. The bipolar quadrupler assembly 810 (denoting the multiplier 260) connects to the transformer assembly 610 (denoting the transformer 250) at the upper tap 835. The bus bars 830 and 840 connect the packs 770 of ceramic capacitors 790. The high voltage outputs 190 and 195 connect to the capacitive load in the buffer 170 to be charged.

Transformer oil insulates the entire assembly 910 as assemblies 610 and 810 (of respective transformer 250 and multiplier 260) to improve voltage insulation. The primary connectors for the transformer 610 pass through an oil barrier to the bridge inverter 230 and resonant circuit 240, which remain dry. The high voltage outputs 190 and 195 connect to the capacitive load in the buffer 170 to be charged.

In order to achieve a balanced bipolar output, a single transformer 250 drives both positive and negative polarities through separate diode patterns 720 as multipliers 230 that capacitively connect to the transformer secondary legs. The exemplary configuration avoids the typical balance issues experienced by separate supplies of opposite polarity because both of the diode patterns 720 are referenced to the same ground potential 145.

The HVPS 110 controls are open loop with a constant frequency pulse train provided to the four gate controllers in their respective circuits 230. The only feedback monitored by the controller 180 is the charge on both rails 830 and 840 of the high voltage storage capacitors 790 in their packs 770. The controller 180 senses end of charge from these measurements and terminates the charge cycle. Upon the end of the charge cycle, the controller 180 sends a trigger pulse to the high voltage switch in the pulsed power modulator 160 to discharge the system. The controller 180 may also discontinue charging automatically in response to sensing a premature discharge in the pulsed power circuit 160 or upon reaching a time window.

Because of limited power available from the prime power source 150, the HVPS 110 is designed to operate using intermediate energy store capacitors 790 composed of a bank 220 of series-connected super-capacitors 170 serving as a buffer. The super-capacitor buffer is charged at a much lower rate (~1 kW) than the 100 kW output of the high voltage charger 220. The super-capacitor bank 220 comprises a hundred series ultra-low ESR 500 F capacitors 790 connected in packs 770 resulting in a 5 F quadrupler assembly 810, which can be charged to 300 V. The total ESR of the pack 770 is less than 50 mΩ for the frequencies at which the HVPS 110 operates. In summary, a capacitor charger 160 with super-capacitor buffer assembly 170 has been established that fills less than 10 L in volume, achieves output power greater than 100 kW, and can charge to voltages up to 100 kV.

Alternative methods for rapidly charging bipolar high-voltage capacitors include methods, where:
a) constant current supplies of opposite polarities used, or
b) pulsed capacitors of higher capacity are switched onto the capacitor load.

The exemplary embodiments improve on:
(a) by being more power dense and maintaining balance at high rates automatically, and
(b) by having a much deeper magazine for recharge.

Because most pulsed power designs do not require continuous power, the techniques used in the described charger could reduce the size and complexity of many pulsed power systems. The advantage and new features of this design are as follows:
(a) Greater than 10× increase in power density over any commercially available high voltage (>20 kV) supply owing to the use of a low leakage inductance high voltage transformer design, bipolar output voltage multiplier, and super-capacitor buffer.

(b) Balanced bipolar high voltage output from a single supply.
(c) Ability to charge from low power bus while operating at very high peak power.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A high voltage bipolar rectifying multiplier, said multiplier comprising:
    first and second circuit boards disposed mutually in parallel;
    a plurality of series-concatenated diodes in pattern groups disposed between said first and second circuit boards having positive and negative pads disposed at opposite sides of said boards, said pattern groups connected to said pads;
    first and second packs of capacitors disposed respectively on said first and second circuit boards, each pack distributing a capacitor for connecting to a corresponding pattern group; and
    positive and negative output high voltage terminals, said terminals connected to respective said pads of said first and second circuit boards.

2. The multiplier according to claim 1, further including first and second voltage dividers at said opposite sides of respective said first and second circuit boards.

3. The multiplier according to claim 1, wherein said each pack includes a bus bar to connect each said capacitor.

4. A passively balanced bipolar high voltage power supply (HVPS) for driving a switched capacitive load from a super capacitor, said HVPS comprising:
    a full-wave inverter that includes four bridge circuits;
    a resonance circuit;
    a low leakage inductance transformer that includes nested bobbins wrapped by Litz wire; and
    a bipolar rectifying multiplier that includes concatenated diodes and a pair of capacitor packs.

* * * * *